(12) United States Patent
Peter et al.

(10) Patent No.: US 10,987,856 B2
(45) Date of Patent: Apr. 27, 2021

(54) METHOD AND DEVICE FOR PRODUCING AN OBJECT BY USING A 3D PRINTING DEVICE

(71) Applicant: Wacker Chemie AG, Munich (DE)

(72) Inventors: Maximilian Peter, Altoetting (DE); Dag Ager, Landshut (DE); Peter Schablitzki, Landshut (DE); Peter Wirtz, Landshut (DE)

(73) Assignee: Wacker Chemie AG, Munich (DE)

( * ) Notice: Subject to any disclaimer, the term of this patent is extended or adjusted under 35 U.S.C. 154(b) by 324 days.

(21) Appl. No.: 16/063,842

(22) PCT Filed: Dec. 21, 2015

(86) PCT No.: PCT/EP2015/080742
§ 371 (c)(1),
(2) Date: Jun. 19, 2018

(87) PCT Pub. No.: WO2017/108071
PCT Pub. Date: Jun. 29, 2017

(65) Prior Publication Data
US 2018/0370147 A1    Dec. 27, 2018

(51) Int. Cl.
| | |
|---|---|
| *B29C 64/118* | (2017.01) |
| *B29C 64/112* | (2017.01) |
| *B29C 64/264* | (2017.01) |
| *B29C 64/209* | (2017.01) |
| *B29C 64/393* | (2017.01) |
| *B33Y 10/00* | (2015.01) |
| *B33Y 30/00* | (2015.01) |
| *B33Y 50/02* | (2015.01) |
| *B33Y 70/00* | (2020.01) |

(52) U.S. Cl.
CPC .......... *B29C 64/112* (2017.08); *B29C 64/118* (2017.08); *B29C 64/209* (2017.08); *B29C 64/264* (2017.08); *B29C 64/393* (2017.08); *B33Y 10/00* (2014.12); *B33Y 30/00* (2014.12); *B33Y 50/02* (2014.12); *B33Y 70/00* (2014.12)

(58) Field of Classification Search
CPC ... B29C 64/112; B29C 64/264; B29C 64/118; B29C 64/209; B29C 64/393
See application file for complete search history.

(56) References Cited

U.S. PATENT DOCUMENTS

| | | | |
|---|---|---|---|
| 5,303,141 | A | 4/1994 | Batchelder |
| 9,079,441 | B1 | 7/2015 | Giacobbi |
| 2004/0231594 | A1 | 11/2004 | Edwards et al. |
| 2006/0061613 | A1 | 3/2006 | Fienup et al. |
| 2010/0256300 | A1 | 10/2010 | Jandke et al. |
| 2010/0292361 | A1 | 11/2010 | Koellnberger |

(Continued)

FOREIGN PATENT DOCUMENTS

| | | |
|---|---|---|
| CN | 203418763 U | 2/2014 |
| CN | 203992400 U | 12/2014 |

(Continued)

*Primary Examiner* — Jacob T Minskey
(74) *Attorney, Agent, or Firm* — Brooks Kushman P.C.

(57) ABSTRACT

3D printed articles, especially those composed of elastomeric silicones, are provided with details including corners and surfaces of high accuracy by placing voxels or strands of curable material at target locations, where the actual position of the print head is determined, and this actual location rather than an assumed location is used to control material placement.

17 Claims, 3 Drawing Sheets

(56) References Cited

U.S. PATENT DOCUMENTS

| | | |
|---|---|---|
| 2011/0003906 A1 | 1/2011 | Angermaier et al. |
| 2011/0196096 A1 | 8/2011 | Angermaier et al. |
| 2012/0156319 A1 | 6/2012 | Hehl |
| 2012/0225208 A1 | 9/2012 | Tanaka et al. |
| 2013/0200554 A1 | 8/2013 | Mueller |
| 2014/0081192 A1 | 3/2014 | Wenske et al. |
| 2014/0197576 A1 | 7/2014 | Kraibuhler et al. |
| 2014/0291358 A1 | 10/2014 | Fliess et al. |
| 2015/0343688 A1 | 12/2015 | Goodman et al. |
| 2015/0352839 A1 | 12/2015 | Folkins et al. |
| 2015/0375246 A1 | 12/2015 | Kalistaja et al. |
| 2016/0009026 A1 | 1/2016 | Kraibuehler et al. |
| 2016/0059495 A1 | 3/2016 | Laubersheimer et al. |
| 2016/0167309 A1 | 6/2016 | Liu et al. |
| 2016/0247036 A1 | 8/2016 | Boschert et al. |
| 2017/0312981 A1 | 11/2017 | Selbertinger et al. |
| 2017/0312987 A1 | 11/2017 | Ladanyi |

FOREIGN PATENT DOCUMENTS

| | | |
|---|---|---|
| CN | 107206687 A | 9/2017 |
| DE | 10 2005 050 185 A1 | 4/2007 |
| DE | 10 2008 000 156 A1 | 7/2009 |
| DE | 10 2008 043 316 A1 | 5/2010 |
| DE | 10 2009 002 231 A1 | 10/2010 |
| DE | 10 2009 027 486 A1 | 1/2011 |
| DE | 10 2010 043 149 A1 | 5/2012 |
| DE | 10 2011 012 412 A1 | 8/2012 |
| DE | 10 2011 012 480 A1 | 8/2012 |
| DE | 10 2012 204 494 A1 | 9/2012 |
| DE | 10 2011 108 799 A1 | 1/2013 |
| DE | 10 2012 000 664 A1 | 7/2013 |
| DE | 10 2011 106 614 A1 | 3/2014 |
| DE | 10 2013 003 167 A1 | 8/2014 |
| DE | 10 2015 110 342 A1 | 12/2015 |
| EP | 0 122 008 A1 | 10/1984 |
| EP | 0 146 307 B1 | 6/1985 |
| EP | 0 358 452 B1 | 3/1990 |
| EP | 0 398 701 B1 | 11/1990 |
| EP | 0 561 893 B1 | 9/1993 |
| EP | 0 561 919 B1 | 9/1993 |
| EP | 0 915 760 B1 | 5/1999 |
| EP | 1 050 538 B1 | 11/2000 |
| EP | 1 803 728 B1 | 7/2007 |
| EP | 1 886 793 A1 | 2/2008 |
| EP | 2 783 837 A1 | 10/2014 |
| EP | 2 835 249 A1 | 2/2015 |
| JP | 5345359 A | 12/1993 |
| JP | 2002067171 A | 3/2002 |
| JP | 2007106070 A | 4/2007 |
| JP | 2010069713 A | 4/2010 |
| JP | 2011101834 A | 5/2011 |
| KR | 20140102240 A | 8/2014 |
| WO | 02/098576 A1 | 12/2002 |
| WO | 2006033903 A2 | 3/2006 |
| WO | 2008/151063 A2 | 11/2008 |
| WO | 2009/027133 A2 | 3/2009 |
| WO | 2013/069257 A1 | 5/2013 |
| WO | 2013086309 A1 | 6/2013 |
| WO | 2015/014290 A1 | 2/2015 |
| WO | 2015/044372 A1 | 4/2015 |
| WO | 2015/107333 A1 | 7/2015 |
| WO | 2015/120538 A1 | 8/2015 |
| WO | 2016/071241 A1 | 5/2016 |
| WO | 2017/108071 A1 | 6/2017 |

METHOD AND DEVICE FOR PRODUCING AN OBJECT BY USING A 3D PRINTING DEVICE

CROSS REFERENCE TO RELATED APPLICATIONS

This application is the U.S. National Phase of PCT Appln. No. PCT/EP2015/080742 filed Dec. 21, 2015, the disclosure of which is incorporated in its entirety by reference herein.

BACKGROUND OF THE INVENTION

1. Field of the Invention

The invention relates to a method of manufacturing an object using a 3D printing device having at least one printhead having at least one discharge device, wherein the discharge device is set up to place print materials at target positions in order to additively manufacture the object. Further aspects of the invention relate to an elastomer part produced by the method, to a 3D printing device and to a computer program set up to conduct the method.

2. Description of the Related Art

A multitude of different additive manufacturing methods are known for production of prototypes, short runs or individual articles. What is common to these methods, also referred to as 3D printing, is that an article or object is manufactured directly on the basis of a computer model. For production of an object, for example, a powder is selectively consolidated by applying a hardener, with application of the hardener to the powder in a pattern dependent on the object to be manufactured. Further methods include laser sintering, in which powder is consolidated by melting with a laser in the desired form according to a defined pattern, and fused filament fabrication, in which an object is produced layer by layer from a fusible plastic. There are likewise known methods in which a liquid is released dropwise with nozzles and cured, for example, by action of UV radiation.

DE 10 2011 012 412 A1 and DE 10 2011 012 480 A1 describe a device and a method for stepwise production of 3D structures having a printhead arrangement with at least two, preferably 50 to 200, printhead nozzles, which enables the location-selective application of optionally multiple photocrosslinkable materials having different photosensitivity, where the photocrosslinkable materials are subsequently consolidated in a location-selective manner by electromagnetic radiation, especially by two-photon or multiphoton processes in the focus region of a laser. The application of the photocrosslinkable materials by means of inkjet printing places special demands on the viscosity of the photocrosslinkable materials. For instance, the photocrosslinkable materials feature a viscosity of less than 200 mPa·s, especially less than 80 mPa·s, more preferably less than 40 mPa·s. In order to achieve sufficient crosslinking of the material applied by means of two- or multiphoton polymerization, there is a requirement for photoinitiators matched to the laser wavelength and for a polymeric crosslinker component containing photocrosslinkable groups, where the photocrosslinkable groups belong to the class of the acrylates, methacrylates, acrylamides, methacrylamides, urethane acrylates, urethane methacrylates, urea acrylates and urea methacrylates. However, the process described is unsuitable for production of moldings consisting of silicone elastomers. Firstly, the photoinitiators, photosensitizers, coinitiators etc. that are used only have sparing solubility in the (nonpolar) silicone materials, which leads to cloudiness, microphase separation and inhomogeneity. The free-radical curing of silicones functionalized with the aforementioned photocrosslinkable groups is known to have the problem of inhibition caused by oxygen, which considerably lowers the crosslinking rate and results in tacky surfaces. If this effect is countered by increasing the function density of acrylate groups, for example, the result is nonelastic, brittle vulcanizates. Finally, the extremely high local photon density generated by pulsed femtosecond lasers, which is required for a multiphoton polymerization (caused particularly by the low function density of photopolymerizable groups), starts breakdown reactions (carbonization) in the silicone, which leads to unacceptable discoloration and material damage.

Location-selective application of a crosslinkable material can be effected, for example, by means of extrusion. DE 10 2012 204 494 A1 describes the production of a primary dressing made of silicone for wound treatment, one production method for which is by 3D printing. The primary dressing takes the form of a grid or mesh which, in analogy to filament 3D printing, is formed by meandering continuous extrusion of silicone rubber materials through a nozzle and subsequent crosslinking.

Location-selective application of a crosslinkable material can also be effected with printheads which, similarly to a 2D inkjet printer, have a multitude of nozzles. WO 2008/151063 discloses a device based on the use of inkjet printheads. This is done using a modeling liquid which cures on addition of an activator. For this purpose, the apparatus has multiple printheads, where one printhead releases the modeling liquid and a further printhead releases the activator.

US 2012/0156319 A1 relates to a device for production of three-dimensional objects from a consolidatable material. The device comprises a processing unit in which the consolidatable material is converted to a liquid phase and introduced into a reservoir. The material is released from the reservoir via a release unit in the form of individual droplets, in order to form the object.

EP 0 915 760 B1 discloses a three-dimensional printing method with which perceptible structures are produced on a surface. The structures are produced by controlled application of droplets to the surface, wherein multiple different partial sections can be created. It is possible here for adjacent subsections to be produced from different materials. After application, the material applied is cured with UV radiation.

DE 10 2013 003 167 A1 relates to a method of manufacturing a three-dimensional article by additive manufacturing. In the method, at least one consolidatable material is discharged in a controlled manner in order to produce the article. On deployment, structurally different regions of the article are manufactured, with manufacturing of spatial structures according to selected configuration criteria on deployment in the different regions.

DE 10 2011 106 614 A1 relates to a method and a device for production of a three-dimensional article, wherein the article is constructed from a consolidatable material which is either in the liquid phase in its original state or can be liquefied. The liquid material is discharged in the form of droplets and positioned on an object carrier to produce the object. The object carrier and an exit orifice for the material can be aligned relative to one another, with one axis of the exit orifice being displaceable in relation to the object carrier.

DE 10 2005 050 185 A1 discloses a resin formulation for production of medical products by means of 3D printing. In the 3D printing method, the mixture is first heated such that it is converted to a liquid state. In the liquid state, the material is released via inkjet nozzles, with layer-by-layer construction of a three-dimensional article. After exiting from the nozzle, the material solidifies and can be cured with UV radiation.

The quality of the objects achievable by the additive methods known from the prior art to date has not reached the constant quality of comparable objects produced by means of injection molding. Nor is it possible by the known methods to ensure uniform quality of the end product, as is indispensable for the industrial use of the objects produced.

One object of the invention is that of providing an improved method for additive manufacture of objects and a corresponding device with which objects of high quality, for example in relation to surface and trueness to shape, are producible. A further object of the invention is that of providing a method by which a uniform quality of the objects produced can be ensured.

SUMMARY OF THE INVENTION

The invention provides a method of producing an object using a 3D printing device which has at least one printhead having at least one discharge device, wherein the discharge device is set up to place print materials at target positions in order to additively manufacture the object. In addition, the position of the printhead is constantly determined by a position measurement and the print materials are placed by the discharge device depending on the constantly determined position of the printhead.

DETAILED DESCRIPTION OF THE PREFERRED EMBODIMENTS

Figure 1:
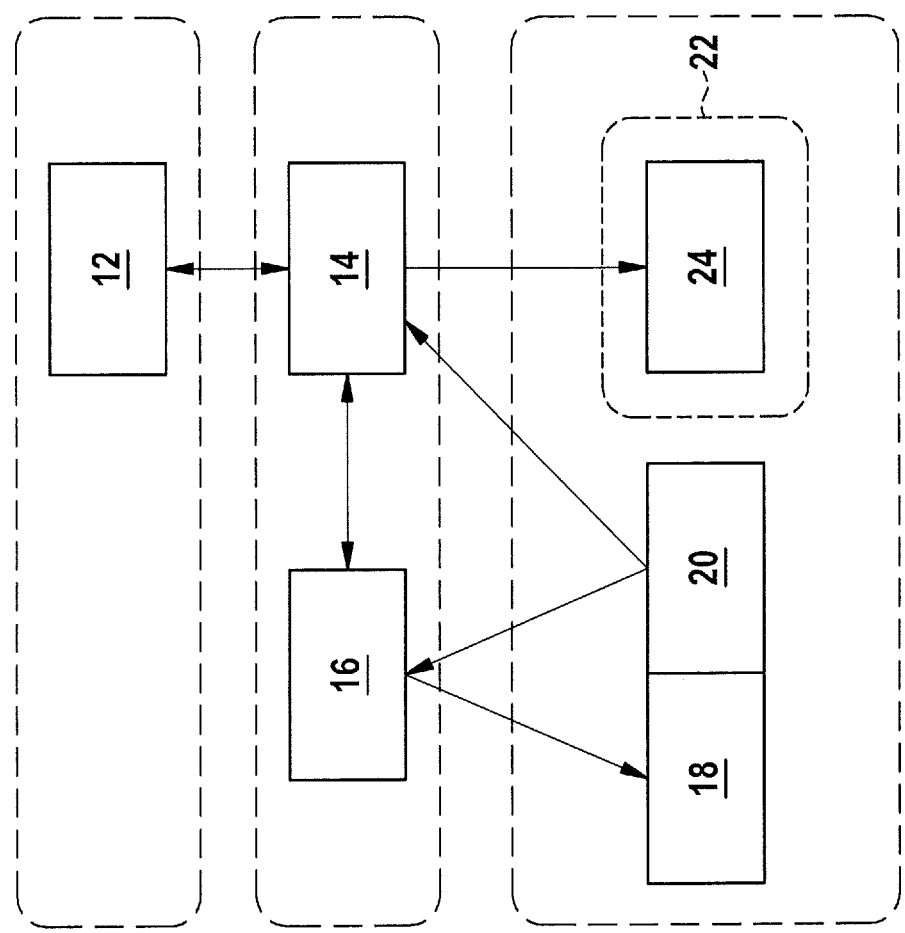
FIG. 1 illustrates a schematic diagram of a working example of the method.

More particularly, is the invention makes it possible to provide multiple discharge devices, including those that are technically different, for various print materials in the 3D printing device, and these are operated in such a way.

The 3D printing device comprises a baseplate on which the object is built up by discharge of print material from the at least one discharge device of the at least one printhead. The baseplate and the at least one printhead here are moved relative to one another, with relative movements being possible in all three spatial directions X, Y and Z. For this purpose, for example, the at least one printhead may be arranged such that it is movable in X and Y direction, and the baseplate can be arranged such that it is movable in Z direction. Further configurations are also conceivable here; for example, the baseplate may be arranged so as to be movable in Y direction and the at least one printhead may be arranged so as to be movable in X and Z direction. Alternatively or additionally, the baseplate and/or the printhead may be configured so as to be pivotable, such that any desired spatial arrangements are possible.

The respective discharge device has a discharge axis which defines the direction in which the material is discharged from the discharge device. Typically, the discharge axis is oriented with reference to the baseplate such that it is at right angles to the baseplate. Optionally, the 3D printing device may be configured such that the alignment of the discharge axis can additionally be altered relative to the baseplate.

The discharge device is preferably set up to release print materials in the form of individual isolated droplets, as a series of droplets or in the form of a strand in the direction of the discharge axis. Flowing transitions between these forms are possible. In the context of this description, a droplet of a print material discharged from the discharge device and placed on the baseplate or on the object is referred to as a voxel. A placed print material is understood to mean either a voxel or a strand. The print material used is preferably a material which is in a free-flowing form at least during processing and can be cured after discharge.

For release of individual droplets, the discharge device may comprise one or more nozzles which emit liquid droplets of print material in the direction of the baseplate, similarly to the manner of the nozzles of an inkjet printer. Therefore, these nozzles are also referred to as jetting nozzles. Various embodiments are known to those skilled in the art. The jetting nozzles are set up such that they release a droplet in a controlled manner only on demand. In preferred embodiments of the jetting nozzles, on discharge of the print material, the volume of the droplet can be affected, such that droplets of different size can be generated.

It is possible to provide, for example, a heating element in the jetting nozzle, with which the print material is heated, and a droplet of a vapor bubble that arises is driven out of the jetting nozzle; this is known as a bubblejet.

A further option is the arrangement of a piezo element which deforms owing to an electrical voltage and, as a result, can eject a droplet from a jetting nozzle. Inkjet printing methods of this kind are known in principle to the person skilled in the art from conventional printing and from what is called 3D printing, in which three-dimensional articles are built up layer by layer from a photopolymerizable ink. Printheads of this kind, as used in inkjet printing or in multijet 3D printing, can typically dose low-viscosity printing inks or print materials, for example those with viscosities below 50 mPa·s.

In the printheads in the method of the invention, preference is given to using discharge devices based on jet valves with piezo elements. These enable the discharge both of low-viscosity materials, where droplet volumes for droplets of a few picoliters (pL) (2 pL correspond to a droplet diameter of about 0.035 μm) can be achieved, and of moderate- and high-viscosity materials such as the silicone rubber materials, where preference is given to piezo printheads with a nozzle diameter between 50 and 500 μm and droplet volumes in the nanoliter range (1 to 100 nL) can be generated. With low-viscosity materials (<100 mPa·s), these printheads can deposit droplets with very high dosage frequency (about 1-30 kHz), whereas, with higher-viscosity materials (>100 Pa·s), depending on the rheological properties (shear-thinning characteristics), dosage frequencies of up to about 500 Hz can be achieved. Suitable jetting nozzles are described, for example, in DE 10 2011 108 799 A1.

For release of strands of print material, the print material is expressed as a strand through a nozzle under pressure on a reservoir vessel, for example from a cartridge, syringe or vat, and selectively deposited on the baseplate to form the object. Discharge devices of this kind are referred to in the context of this description as dispensers. The pressure can be built up, for example, by means of air pressure or by mechanical means, for example by a small extruder, by means of a piston pump or by means of an eccentric screw. Various embodiments are known to those skilled in the art.

In order to construct an object with the print materials discharged, the print materials are deposited on the baseplate according to a defined scheme, forming a first material layer. After the first material layer has been formed, for example, the distance between the discharge device and the baseplate is increased and the next material layer is deployed. These are followed by further material layers, each of which is deposited according to a defined scheme, until the desired object has been completed.

The print materials are discharged according to a scheme derived from a template. The template has generally been designed with CAD (Computer-Aided Design) software or is created by three-dimensional scanning of an article. For derivation of the scheme for the material discharge, the software typically calculates horizontal sections of the template, with each of these sections corresponding to a material layer. Subsequently, a calculation is made as to how the print materials have to be positioned in the respective layer. What is taken into account here is whether the print materials are discharged in the form of voxels, in the form of strands, or in a combination of voxels and strands.

If appropriate, the placing of support material is also allowed for in the derivation of the scheme. The placing of support material may be necessary when the object to be produced is to have cavities, undercuts, overhanging, self-supporting or thin-walled parts, since the print materials cannot be placed free-floating in space. The support material fills cavities during the printing process and serves as a basis or scaffold in order to be able to place and cure the print materials thereon. After the printing process has ended, the support material is removed again and clears cavities, undercuts and overhanging, self-supporting or thin-walled geometries of the object. In general, support material used is a material different from the material of the print materials. Depending on the geometry of the object, the necessary shape of the support material is calculated. In the calculation of the shape of the support material, it is possible to use various strategies in order, for example, to use a minimum amount of support material or to increase the trueness to scale of the product.

In the derivation of the scheme for the material discharge from the horizontal sections, it is possible to use various movement strategies, where the choice of the movement strategy can affect the properties of the object produced. In the case of discharge in the form of voxels, it is possible to use, for example, a dual movement strategy, a xing ("crossing") movement strategy or a border movement strategy.

In the dual movement strategy, the at least one printhead is moved back and forth line by line in a selected main print direction in relation to the baseplate, and print material is dosed line by line. After each line, the printhead is moved further by one line width at right angles to the printed line, then the discharge of the print material is repeated. The process is similar to the printing of a conventional inkjet printer.

The xing movement strategy corresponds very substantially to the dual movement strategy. By contrast to the dual movement strategy, the main printing direction is rotated by 90° after every or after every nth material layer (where n is a natural number). This leads to more exact compliance with the dimensional stability of the object because the rotation of the material layers ensures a homogeneous distribution of the print material.

Advantages of the dual movement strategy and also of the xing movement strategy are that, for example, high accuracy of the edges of the object can be achieved.

In the border movement strategy, for each material layer, first the outer circumference of the object is produced and subsequently the enclosed area is filled in, for example by means of the dual movement strategy or the xing movement strategy. In the border movement strategy, the outer circumference of the layer to be printed can be generated with smaller voxels in higher resolution than the interior of the layer to be printed or the internal volume of the object. In the interior of the object to be produced, it is possible to use larger voxels for filling, without the associated lower resolution having any effect on the accuracy of the geometric dimensions or on the surface quality of the object to be produced.

The movement strategies named are basic patterns. They can also be combined and varied within the scope of the same object if it seems appropriate. Mixed forms between the different movement strategies are also conceivable.

If the print materials take the form of voxels, in addition to the choice of movement strategy, it is also possible to include a voxel offset in the creation of the scheme for the material discharge. In this case, the voxels are not rigidly aligned in an orthogonal pattern within a layer, but may be placed offset to one another. For example, in the case of approximately spherical voxels, every second line can be placed offset by half a voxel diameter. This can reduce the line separation compared to an orthogonal grid. The voxels are placed more densely and there is a rise in the surface quality. The offset of the voxels can decrease the edge sharpness.

Additionally or alternatively to offset placing of the voxels in the plane of a material layer, it is possible to dispose the voxels of two adjacent planes offset from one another.

If the discharge device has been set up to place voxels of different size, it is additionally possible, especially in the region of the edges of the object, to vary the size of the print materials placed in order to achieve a higher edge sharpness. Preferably, the site at which a voxel is placed and the size thereof are chosen such that the edges of the object are reproduced with maximum exactness. For example, in the region of an edge, multiple smaller voxels are positioned rather than an individual voxel. The achievable edge sharpness and/or surface quality is increased as a result.

In the method, it is preferably the case that the position of the printhead is determined constantly by a position measurement unit. As a result, the relative position of the printhead to the baseplate and hence to the object to be produced is established. Preferably, for this purpose, the position is determined for each of the three spatial directions X, Y and Z. The position is determined at least for those spatial directions that are in a plane parallel to the baseplate.

The constant determining of the position of the printhead is advantageous, for example, if the production of the object has to be interrupted. An interruption of this kind may become necessary, for example, in order to clean the discharge device used. For this purpose, the printhead may be brought to a safe position removed from the already partly formed object, where it may be cleaned. Any changes in position of the printhead in the cleaning, for example through forces transmitted to the printhead during the cleaning, are constantly determined as before and taken into account when the printing operation is continued again. In a preferred embodiment, the 3D printing device comprises a cleaning station which enables automatic cleaning. The cleaning intervals are preferably programmable, such that they can be adjusted depending on the print material processed. The cleaning serves for quality assurance since only in the case of a clean nozzle is the desired voxel, i.e. strand geometry, assured.

A further reason for an interruption may be the triggering of a safety device. The printhead is a moving part, and there is the risk that a user of the 3D printing device will be injured if, for example, his/her hands come close to moving parts. In the prior art, therefore, emergency off switches are customary, which stop the power supply to the positioning unit used. Owing to the inertia of the printhead or owing to external forces being applied to the printhead, it can continue to move even after the power supply has been stopped, and so its actual position can differ from the last known target position. Advantageously, operation of the position measurement unit continues, such that, even when an emergency off switch is triggered, the position of the printhead is still continuously determined. For this purpose, it is preferably the case that the power supply for the position measurement unit is separated from that of the positioning unit. This enables seamless continuation of the production of the object in that the printhead, after restoration of the power supply of the positioning unit, is guided back to its target position. Advantageously, it is thus possible to complete and conserve, in particular, complex or costly 3D objects that would otherwise have been rejects after an emergency switchoff.

A further advantage of the constant determination of the actual position of the printhead is that failure to reach a defined position can be recognized. A defined target position is considered not to have been reached when the actual position of the printhead determined differs by more than a given tolerance. This can, for example, be fixed, for example in the range from 0.1 to 0.5 mm. It is likewise conceivable to define the tolerance in relation to the size of a voxel or a strand, for example based on the diameter of a virtually spherical voxel or the diameter of a strand. For example, a position can be considered to be "not reached" when the measured position does not correspond to the target position within the range of tolerance at any time within a defined period. Positions that have not been reached are, for example, communicated back to the control unit, and then the information is processed further, for example recorded and used to control the remainder of the printing operation.

In the method, it is also the case that the print materials are placed by the discharge device depending on the constantly determined position of the printhead. The print material is discharged through the discharge device in each case taking account of the actual position ascertained and not on the basis of an assumed target position.

Advantageously, knowledge of the actual positions of the print materials placed is obtained. It has been recognized that, for improvement of the quality of the object to be printed, knowledge of the actual positions of the print materials placed is of high relevance. With this knowledge, it is possible to adjust the volume and size of the voxels and/or the diameter of the strands during printing in a controlled manner. In the context of the invention, it is also possible to improve the quality by adjusting the movement strategy, curing strategy and/or, for example, the voxel displacement depending on the actual positions of the voxels and strands placed. It has been found that objects produced by the method of the invention can thus have a quality comparable to or exceeding that of injection-molded objects.

Knowledge of the actual positions of the voxels and strands placed can especially be taken into account in the determination of the scheme used to discharge the print material. Preferably, the scheme is updated constantly according to the determined position of the printhead. In addition, knowledge of the actual positions of the voxels and strands placed can be taken into account in the planning and placing of support material.

In a preferred embodiment of the invention, erroneously unplaced print materials are determined. If a defined position is not reached by the printhead, it is not possible for print material to be discharged as intended at the defined position.

This is manifested in the object as erroneously unplaced print material. If an erroneously unplaced print material is recognized, this is preferably recorded together with the position at which the print material should be placed. In order to reprint the unplaced print materials, the printhead is moved back to the recorded position and the discharge is repeated.

In a further-preferred embodiment of the invention, erroneously unplaced print materials may be determined and reprinted prior to curing thereof. The reprinting of unplaced print materials prior to curing has the advantage that the as yet uncured print materials can still bond seamlessly to one another. The print material used is preferably still free-flowing after application, such that the print materials placed can merge with one another, resulting in a smooth transition between the print materials placed.

Alternatively or additionally to the reprinting of the unplaced print materials, an error message or a warning message may be issued. This is advisable since an unreached position can indicate problems with the positioning unit used for the positioning of the printhead.

In preferred embodiments, the function of the discharge device is monitored. For this purpose, a sensor unit may be provided, which recognizes print material discharged from the discharge device. The sensor unit can preferably be configured in contactless form, for example in optical form by light barrier. A print material not discharged at a position reached can indicate problems with the discharge device. Such a problem may, for example, be a blocked nozzle or an air bubble in the feed of the print material to the printhead. If the 3D printing device is equipped with a cleaning station, in the event of recognition of a blocked nozzle, a cleaning operation can automatically be initiated.

It is preferably the case that curing of the print materials is effected by means of radiation or by thermal means, more preferably in a location-selective manner or over the full area by means of radiation or thermal means. Preference is thus given to using, in the process proposed, print materials which, after being placed, can be cured via action of radiation or heat.

Location-selective exposure is understood to mean that the heat or radiation source is arranged in a movable manner relative to the baseplate and acts only on selected regions of the object. An areal exposure is understood to mean that the heat or radiation source acts all at once over the entire object or an entire material layer of the object.

For example, in the case of the process proposed, a print material which can be cured via action of actinic radiation is used, preferably by action of UV/VIS radiation. UV radiation or UV light has a wavelength in the range from 100 nm to 380 nm, while visible light (VIS radiation) has a wavelength in the range from 380 to 780 nm. Preferably, the action of the UV/VIS radiation on the print material is effected via an exposure unit.

In the case of print materials that cure by thermal means, it is possible to use an infrared source (IR) in order to conduct a location-selective or areal heat treatment.

In the method of the invention, the print materials used are more preferably silicone rubber materials that crosslink via UV/VIS-induced addition reaction. UV/VIS-induced crosslinking has advantages over thermal crosslinking. Firstly, intensity, action time and action site of the UV/VIS radiation can be judged accurately, while heating of the discharged print material (and subsequent cooling thereof) is always delayed owing to the relatively low thermal conductivity. Owing to the intrinsically very high coefficient of thermal expansion of the silicones, the temperature gradients that inevitably exist in thermal crosslinking lead to mechanical stresses which adversely affect the trueness to scale of the object formed, which in the extreme case can lead to unacceptable distortions in shape.

UV/VIS-induced addition-crosslinking silicone rubber materials are described, for example, in DE 10 2008 000 156 A1, DE 10 2008 043 316 A1, DE 10 2009 002 231 A1, DE 10 2009 027 486 A1, DE 10 2010 043 149 A1 and WO 2009/027133 A2. The crosslinking comes to rise through UV/VIS-induced activation of a light-sensitive hydrosilylation catalyst, preference being given to complexes of platinum. The technical literature describes numerous light-sensitive platinum catalysts which are largely inactive with exclusion of light and can be converted by irradiation with light having a wavelength of 250-500 nm to platinum catalysts that are active at room temperature. Examples of these are (η-diolefin)(σ-aryl)platinum complexes (EP 0 122 008 A1; EP 0 561 919 B1), Pt(II)-β-diketonate complexes (EP 0 398 701 B1) and (η5-cyclopentadienyl)tri(σ-alkyl)platinum(IV) complexes (EP 0 146 307 B1, EP 0 358 452 B1, EP 0 561 893 B1). Particular preference is given to MeCpPtMe$_3$ and the complexes that derive therefrom through substitution of the groups present on the platinum, as described, for example, in EP 1 050 538 B1 and EP 1 803 728 B1. The print materials which crosslink in a UV/VIS-induced manner can be formulated in one- or multicomponent form.

The rate of the UV/VIS-induced addition crosslinking depends on numerous factors, especially on the nature and concentration of the platinum catalyst, on the intensity, wavelength and duration of action of the UV/VIS radiation, the transparency, reflectivity, layer thickness and composition of the silicone rubber material, and the temperature.

The platinum catalyst is preferably used in a catalytically sufficient amount, so as to enable sufficiently rapid crosslinking at room temperature. Preference is given to using 0.1 to 500 ppm by weight of the catalyst based on the content of Pt metal relative to the overall silicone rubber material, preferably 0.5 to 200 ppm by weight, more preferably 1 to 50 ppm by weight.

For the curing of the silicone rubber material that undergoes addition crosslinking in a UV/VIS-induced manner, preference is given to using light of wavelength 240 to 500 nm, more preferably 250 to 400 nm, yet more preferably 350 to 400 nm, and most preferably 365 nm. In order to achieve rapid crosslinking, which shall be understood to mean a crosslinking time at room temperature of less than 20 min, preferably less than 10 min, more preferably less than 1 min, it is advisable to use a UV/VIS radiation source having a power between 10 mW/cm$^2$ and 20,000 mW/cm$^2$, preferably between 30 mW/cm$^2$ and 15,000 mW/cm$^2$, and a radiation dose between 150 mJ/cm$^2$ and 20,000 mJ/cm$^2$, preferably between 500 mJ/cm$^2$ and 10,000 mJ/cm$^2$. Within the scope of these power and dose values, it is possible to achieve area-specific irradiation times between a maximum of 2000 s/cm$^2$ and a minimum of 8 ms/cm$^2$.

For the implementation of the curing, a curing strategy is used. Preferably, curing of the print materials follows the placing of a layer of print materials or the placing of multiple layers of print materials, or is effected directly during printing.

Curing of the print materials directly during printing is referred to as a direct curing strategy. If print materials curable by UV/VIS radiation are used, by comparison with other curing strategies, the UV/VIS source is active for a very long period, and so it is possible to work with very much lower intensity, which leads to slower crosslinking through the object. This limits the heating of the object and leads to objects that are true to scale since no expansion of the object occurs owing to temperature peaks.

In the per layer curing strategy, the placing of every complete material layer is followed by the radiation-induced crosslinking of the material layer placed. During this operation, the freshly printed layer becomes bonded to the cured printed layer beneath. The curing does not follow immediately after the placing of a print material, and so the print materials have time to relax before the curing. What is meant thereby is that the print materials can merge with one another, which achieves a smoother surface than in the direct curing strategy.

In the nth layer curing strategy, the procedure is similar to that in the per layer curing strategy, except that the curing is undertaken only after the placing of n material layers where n is a natural number. The time available for the relaxing of the print materials is increased further, which further improves the surface quality. Owing to the flow of the print materials, however, there can be a decrease in the edge sharpness achievable.

In a preferred embodiment, the curing strategy is matched to the reprinting of unplaced print materials. For example, the printing of a material layer may be followed in each case by the reprinting of the erroneously unplaced print materials before the crosslinking of the material layer placed is effected by the per layer curing strategy or nth layer curing strategy.

The properties of the object to be produced can be affected by appropriate choice of the parameters used in the placing of the print materials, especially the parameters of the discharge device. Examples of properties of the object that can be influenced are edge sharpness, surface quality and dimensional stability. The properties of the object to be produced are determined by the configuration of the discharge device before commencement of printing.

Some jetting or dispenser operating parameters can, in the context of the invention, also be varied during printing, for example in each case after one or more material layers or even from voxel to voxel, from strand to strand, from voxel to strand or from strand to voxel, more particularly depending on known actual positions of the voxels and strands already placed, which enables readjustment of the properties of the object to be produced.

Preferably, in the case of print materials in the form of voxels, an edge sharpness of the object is readjusted by adjustment of the voxel size and/or a surface quality of the object is readjusted by adjustment of a voxel offset and/or a dimensional stability of the object is readjusted by adjustment of a movement strategy of the discharge device. The voxel size can be varied as described herein by the configuration of the jetting parameters.

Preferably, in the case of print materials in the form of strands, an edge sharpness and a surface quality of the object are readjusted by adjustment of a volume flow rate and/or a dimensional stability of the object is readjusted by adjustment of a movement strategy of the discharge device. The volume flow rate can be varied as described herein by the configuration of the dispenser parameters.

Edge sharpness is understood to mean the sharpness of the delimitation of a region belonging to the object where print materials are to be placed with respect to a region outside the object where no print materials are to be placed. The more abrupt the transition, the higher the edge sharpness. Typically, the edge sharpness improves when the size of the voxels or the diameter of the strands is reduced. Conversely, the edge sharpness falls when the size of the voxels or the diameter of the strands is increased. In addition, under the aspect of edge sharpness, the radius of an object boundary can also be taken as a measure of accuracy.

The surface quality is understood to mean the smoothness of a surface. A surface of high quality is completely continuous and smooth. Surfaces of this kind are ideally achieved, for example, by injection molding.

Dimensional stability is understood to mean the trueness to scale of the geometric dimensions of the object, i.e. that they have only small deviations, if any, from the dimensions of the template.

Additionally or alternatively to the updating of the scheme depending on the determined position of the printhead, the position of the printhead and/or of the baseplate on which the object is disposed can be readjusted depending on the constantly determined position of the printhead to assume an exact position. For this purpose, a positioning unit used for positioning of the printhead or the baseplate is actuated such that the constantly measured position of the printhead, i.e. the actual position, is constantly used to track a defined target position. For this purpose it is possible to use a closed-loop control system with which the positioning unit is actuated such that the deviation of the actual position from the target position is minimized.

As a result, using stepper motors in the positioning unit, it is possible to recognize any step losses that occur and compensate for them directly. As a result, it is likewise possible to dispense with the use of stepper motors and to use a different electric motor, for example a DC motor, as drive for the positioning unit. In both cases, precise positioning of the printhead is advantageously assured.

Preferably, in addition to the position of the printhead, an instantaneous speed of the printhead is determined constantly and the print materials are placed depending on the constantly determined position of the printhead and on the constantly determined instantaneous speed of the printhead. In the case of print materials in the form of strands, this is preferably done by setting of a volume flow rate.

The volume flow rate refers here to the volume of the print material discharged per unit time. In the placing of strands, the printhead moves with the discharge device during the discharge of the strand relative to the baseplate or the object. The shape of the strand placed on the baseplate or the object is dependent on the volume flow rate and the instantaneous speed of the printhead, and on the distance from the baseplate, or on the penetration depth of the nozzle into the last layer. It is thus advantageous, for placing of a defined amount of print material, to match the volume flow rate to the instantaneous speed in order that the shape of the strand placed corresponds to the desired shape.

In the case of voxels, it may likewise be advisable to constantly determine the instantaneous speed of the printhead. A voxel is a droplet of discharged print material which, after being discharged from the discharge device, falls from the latter onto the baseplate or the object. The droplet here describes a flight path dependent on the instantaneous speed of the printhead. Dependent on the flight path, in turn, is the position on the base plate or the object where the droplet or voxel is actually placed. It is thus advantageous, even in the case of print materials in the form of voxels, to take account of the instantaneous speed.

Preferably, the method proposed finds use in the production of objects that are elastomer parts, especially silicone elastomer parts. For the production of the elastomer part, preference is given to using one of the print materials proposed above. Elastomers, especially silicone elastomers, place specific demands on the 3D printing process since these materials, by contrast, for example, with thermoplastics, are elastic and can be deformed during the production of the object. In addition, the uncrosslinked materials are free-flowing until they are cured, such that the liquid to pasty print materials placed during the 3D printing can flow. More particularly, reliable dosage of ultrasmall volumes of these materials in the discharge device is difficult, and so reliable placing of the print materials can be guaranteed only by the method proposed. If, moreover, erroneously unplaced print materials are not reprinted as proposed, gaps in the object or defects will arise, which can be manifested, for example, in the form of incompletely continuous, uneven and/or rough surfaces or trapped air or gas volumes.

The invention also relates to an elastomer part, especially silicone elastomer part, produced by the process proposed. The elastomer part is preferably constructed using one of the print materials described above.

The elastomer part produced by the process proposed is notable for a quality which can correspond to or even exceeds the quality of elastomer parts produced by means of injection molding. At the same time, the surface can be adjusted as desired. The surface can, for example, be structured, especially given a regular structure, or may be smooth and/or completely continuous. By comparison with many injection-molded objects, elastomer parts produced in accordance with the invention also do not have any trapped air or gas bubbles. Thus, mechanically stressable objects with reliable physical properties can be produced, which are also suitable, for example, for medical applications. For example, it is possible to assure elasticity or smoothness properties, or isotropic optical transparency in the case of optical lenses. In addition, it is a feature of the elastomer part that its geometry is not limited by the molds used in casting methods. Thus, the elastomer part can have undercuts and/or enclosed cavities. The elastomer part is likewise free of burrs which occur in injection-molded parts especially at the separation of the mold halves and at the runner system.

Also proposed in accordance with the invention is a computer program which performs the control of a method described herein when the computer program is executed on a programmable computer device. The computer program may, for example, be an application or a program module for actuation of a 3D printing device. The computer program may be stored on a machine-readable storage medium, for instance on a permanent or rewritable storage medium or in assignment to a computer device or a removable CD-ROM, DVD, Blu-ray disk or a USB stick. Additionally or alternatively, the computer program may be provided on a computer device, for instance, on a server for downloading, for example via a data network such as the Internet or a communications connection, for instance a telephone line or a wireless connection.

A further aspect of the invention is that of providing a 3D printing device for production of an object by the 3D printing method. The 3D printing device has at least one printhead having at least one discharge device, wherein the discharge device has a control unit in order to place print materials at target positions in order to additively manufacture the object. The 3D printing device also has a position measurement unit, by means of which the position of the printhead can be determined constantly, wherein the position measurement unit is connected to the control unit of the discharge device, and wherein the discharge device is set up to place the print materials depending on the constantly determined position of the printhead.

The 3D printing device is designed and/or set up to execute one of the methods described herein. Accordingly, features described in the context of the methods are disclosed correspondingly for the 3D printing device and, conversely, the features described in the context of the 3D printing device are correspondingly disclosed for the methods.

The discharge device has a control unit. The control unit controls the placing of print materials by the discharge device depending on the determined position of the printhead. In addition, the control unit can also use further input parameters for this purpose, for example the instantaneous speed of the printhead. The instantaneous speed here can be calculated by the control unit, for example, from the constantly determined position of the printhead, in that the position of the printhead is determined at two junctures, and the difference between the positions determined is formed and divided by the time elapsed between the two junctures.

The control unit may, for example, comprise a microcontroller connected to the position measurement unit and the discharge device. The control unit may be executed as a separate unit or else in combination with a machine control system of the 3D printing device. The machine control system may likewise comprise a microcontroller, in which case this is connected to a positioning unit.

The positioning unit is set up to position the at least one printhead relative to a baseplate, where the relative position is adjustable at least along the three spatial axes X, Y and Z, and possibly also rotatable. The positioning unit comprises at least one motor, typically with at least one separate motor provided for every adjustable spatial axis. The motor is executed, for example, as an electric motor, especially as a stepper motor.

The discharge device has a jetting nozzle actuated by the control unit or a dispenser. In one embodiment, the 3D printing device has multiple configured discharge devices assigned to a printhead, which are set up to place print materials depending on the constantly determined position of the printhead. The printhead here may have multiple different discharge devices, for example one or more jetting nozzles and one or more dispensers. In this case, for example, the print materials can be placed in the interior of the object by means of the dispenser(s) and the surface of the object can be produced in high quality with the jetting nozzle(s). Alternatively, it is conceivable that the printhead comprises multiple equivalent discharge devices. In this way, for example, multiple objects can simultaneously be additively produced, or it is possible to work with multiple discharge devices in parallel on the construction of a single object. In both cases, the printing time required overall is reduced.

In the case of a jetting nozzle as discharge device, the control unit defines when the jetting nozzle discharges a voxel. In addition, the control unit may define the size of the voxel.

In the case of a dispenser as discharge device, the control unit defines when the dispenser commences with the discharge of print material in the form of a strand and when the discharge is ended. In addition, the volume flow rate, i.e. how much print material is discharged within what time, may be defined by the control unit.

If support material is used, the printhead may have one or more further discharge devices for the support material. Alternatively or additionally, it is also possible for a further printhead with an appropriate discharge device to be provided for the discharge of support material.

The position measurement unit is set up to constantly determine the position of the at least one printhead. For this purpose, the position measurement unit may undertake measurements of the position of the printhead at a defined rate and transmit them to the control unit.

The position measurement unit is preferably set up to undertake a measurement of the position with reference to every axis or spatial direction adjustable by the positioning unit.

The position measurement unit is at least set up to determine the position of the printhead within a plane parallel to the baseplate. It is preferably set up to determine the position of the printhead in space.

The position measurement unit preferably has at least one step counter in the motor, rotary encoder, optical scale, especially a glass scale, GPS sensor, radar sensor, ultrasound sensor, LIDAR sensor and/or at least one light barrier. The step counter in the motor may especially be configured as a contactless switch, for example as a magnetic sensor, especially a Hall sensor.

The 3D printing device preferably additionally has a main controller containing a template or a computer model of the object to be printed, where the main controller and the control unit of the discharge device are set up for bidirectional communication with one another.

The main controller may be executed, for example, as a computer which communicates with the control unit, for example via a data network, for example ethernet or WLAN, or via a connection, for example a serial connection or USB.

The computer model may be recorded in the main controller in any file format. Standard file formats include, for example, STL, OBJ, CLI/SLC, PLY, VRML, AMF, STEP, IGES. In the execution of the method described, the main controller produces virtual horizontal slices through the model (called slicing). These horizontal sections are subsequently used to calculate a scheme which states how the print materials have to be positioned for additive construction of the object. What is taken into account here is whether the print materials are discharged in the form of voxels, in the form of strands, or in the form of a combination of voxels and strands. If the shape of the object requires the placing of support material, the main controller is preferably set up to generate a scheme for placing of support material as well. The calculation and placing of support material can also be effected in a decoupled manner.

During the production of the object, the main controller and control unit communicate with one another, such that the main controller can update the scheme depending on the determined position of the printhead and optionally further determined parameters. The main controller can likewise receive messages about errors that occur and/or about erroneously unplaced print materials, which can be taken into account correspondingly.

The direct feedback of the position of the printhead to the main controller makes it possible for the main controller to directly influence the movement pathways of the printhead.

For example, it is possible to accelerate and slow down the printhead outside the object, such that the printhead moves at constant speed relative to the object during the actual printing operation in which print materials are placed. Especially at high speeds, it is thus possible to avoid or reduce resonances or vibrations, which leads to a higher quality of the object. The acceleration outside the object leads to shorter dead times in idle runs, which reduces the time required for the printing and hence in turn the printing costs per object.

If print materials which cure under UV/VIS are used, the 3D printing device preferably has a UV/VIS source. In the case of location-selective exposure, the UV/VIS source is arranged so as to be movable relative to the baseplate and illuminates only selected regions of the object. In the case of full-area exposure, the UV/VIS source, in one variant, is configured such that the entire object or an entire material layer of the object is exposed all at once. In a preferred variant, the UV/VIS source is designed such that its light intensity or its energy can be variably adjusted and that the UV/VIS source exposes just a subregion of the object at any time, it being possible to move the UV/VIS source relative to the object in such a way that the entire object can be exposed with the UV/VIS light, optionally in different intensity. For example, the UV/VIS source, for this purpose, is configured as a UV/VIS LED bar and is moved relative to the object, or over the printed object.

Preferably, the 3D printing device comprises a cleaning station which enables automatic cleaning of the discharge device of the at least one printhead. Owing to the constant determination of the position of the printhead, cleaning can also be undertaken during the production of an object. For this purpose, the printing is interrupted and the printhead is moved to the cleaning station. After conducting the cleaning operation, the printhead is guided precisely to the next position at which a print material is to be placed and the printing operation is continued.

The figures show working examples of the invention, although the figures show the subject matter of the invention merely in schematic form. The working examples shown and described hereinafter with reference to the figures should not be regarded as being restrictive in respect of the subject matter of the invention. A multitude of modifications possible within the scope of the claims will be apparent to the person skilled in the art.

Figure 2:
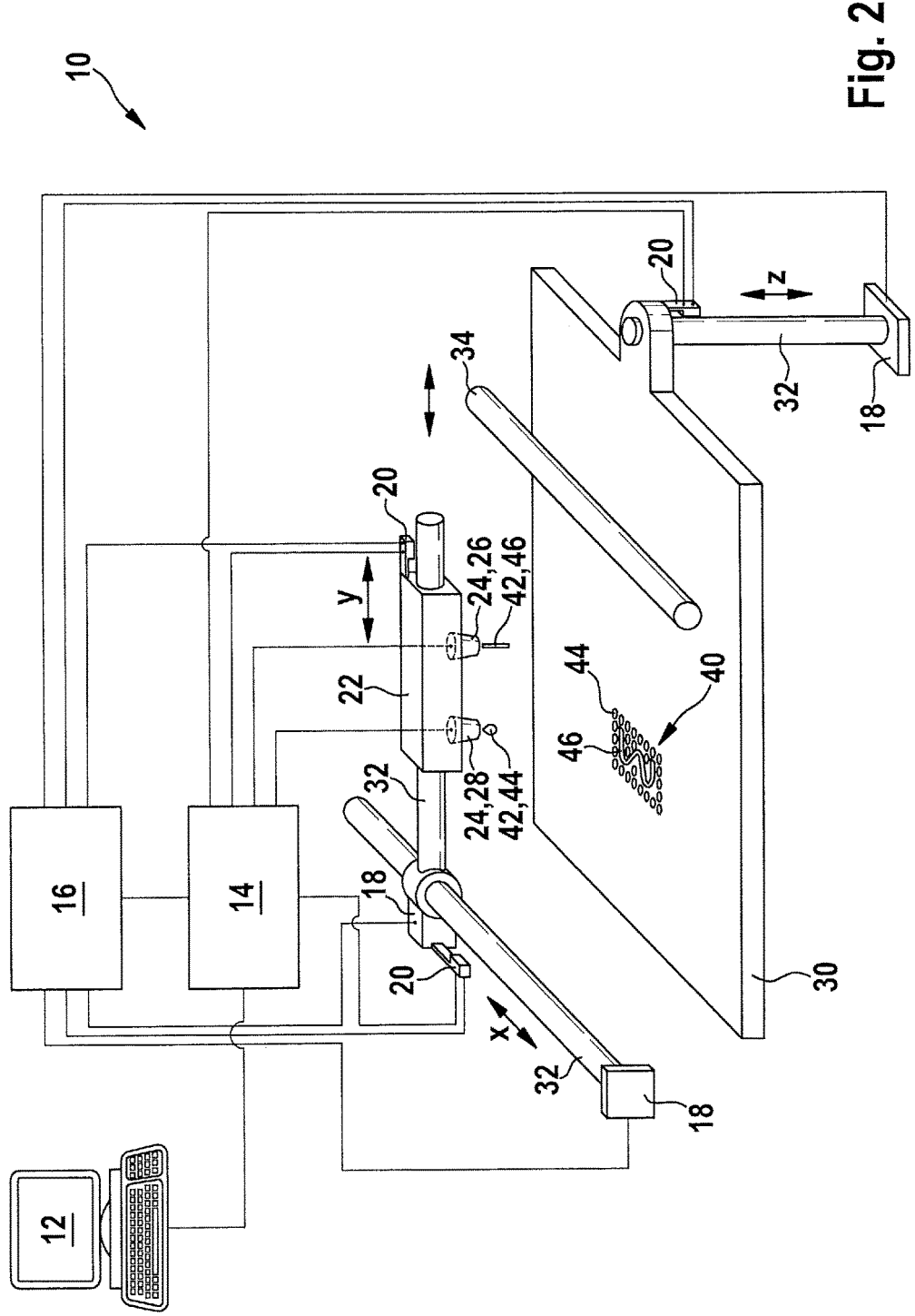
FIG. 2 illustrates a schematic construction of a 3D printing device.
Figure 3A:
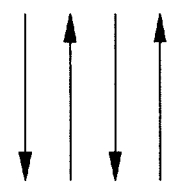
FIG. 3 illustrates various movement strategies and
FIG. 4 illustrates various options for placing of voxels.
Figure 3B:

The figures show:

FIG. 1 a schematic diagram of a working example of the method,

FIG. 2 a schematic construction of a 3D printing device,

FIG. 3 various movement strategies and

FIG. 4 various options for placing of voxels.

In the description of the working examples of the invention which follows, identical or similar components and elements are identified by identical or similar reference numerals, in which case repeated description of these components or elements is dispensed with in individual cases.

FIG. 1 shows a schematic of the procedure of a working example of the method of the invention. A template for an object to be produced is recorded in the main controller 12. The main controller 12 uses this to determine a scheme which describes the sites at which print materials have to be placed to produce the object. These sites are target positions. These target positions are transmitted to a control unit 14. The control unit 14 is connected to a machine control system 16. By means of the machine control system 16, a positioning unit 18 is actuated in order to move a printhead 22 to the target position. Alternatively, the machine control system 16 may have a direct connection to the main controller unit 12 (not shown).

The movement of the printhead 22 is monitored by means of a position measurement unit 20. The position measurement unit 20 and the positioning unit 18/the printhead 22 are coupled to one another, especially by a mechanical connection, in such a way that any change in position of the printhead 22 is determined by the position measurement unit 20. The position measurement unit 20 communicates the determined position of the printhead 22 back to the control unit 14.

The printhead 22 comprises at least one discharge device 24 set up to place print materials for construction of the object. The control unit 14 is connected to the discharge device 24 and controls the discharge of the print materials. It is the case here that the control unit 14 actuates the discharge device 24 depending on the position of the printhead 22 determined constantly by means of the position measurement unit 20. Thus, print materials are placed taking account of the actually determined actual position and not, for instance, under the assumption that the printhead 22 is at the target position.

It may also be the case that the determined positions of the printhead 22 are fed back to the main control system 12 by the control unit 14 via a bidirectional connection. This puts the main control system 12 in a position to plan the further placing of the print materials depending on the determined positions at which print materials have already been placed.

Moreover, as shown, the position measurement unit 20 may additionally communicate the constantly determined position of the printhead 22 to the machine control system 16. In one variant of the method, the latter can generate an error message as a result of this feedback and transmit it to the control unit 14 if the printhead 22 was unable to reach a target position. It is likewise possible to implement a closed-loop control circuit in order to actuate the positioning unit 18 in such a way that the deviation of the position of the printhead 22 determined by the position measurement unit 20 from the target position is minimized. For this purpose, the actual position of the printhead 22 can be readjusted constantly to the target position by means of the positioning unit 18, which is also referred to in the context of the present disclosure as readjustment for taking up an exact position.

FIG. 2 shows a schematic of a 3D printing device 10. The 3D printing device 10 comprises the main control system 12 which contains the template for an object 40 to be produced and is connected to the control unit 14. The 3D printing device 10 further comprises a base plate 30 on which the object 40 is built up additively by the placing of print materials 42.

For placing of the print materials 42, the printhead 22 in the working example shown comprises two discharge devices 24. A discharge device 24 is executed as a jetting nozzle 28. The jetting nozzle 28 places the print materials 42 in the form of individual droplets or voxels 44. The other discharge device 24 is configured as a dispenser 26 and places the print materials 42 in the form of strands 46.

In the working example shown in FIG. 2, both the jetting nozzle 28 and the dispenser 26 are used for additive construction of the object 40, by using the jetting nozzle 28 to place voxels 44 that form the surface of the object 40 and using the dispenser 26 to place strands 46 in order to rapidly fill up the interior of the object 40.

If print material 42 which cures by action of UV/VIS radiation is used, preference is given to providing a UV/VIS light source. In the embodiment of FIG. 2, for this purpose, an LED bar 34 which emits UV/VIS light in a location-selective manner is provided. In order to be able to cover the area of the baseplate 30 with UV/VIS light, the LED bar 34 is designed so as to be movable. In the case of thermally curing print materials 42, as an alternative, preference is given to providing an IR light source set up for location-selective heating of the print materials 42. For this purpose, the IR light source may especially be secured to the printhead 22. Alternatively, a heatable space can be used for curing.

For positioning of the printhead 22, i.e. relative to the baseplate 30, the 3D printing device 10 also comprises three positioning units 18, where each of these positioning units 18 enables movement in one of the three spatial axes X, Y and Z. For this purpose, each of the positioning units 18 is connected to an axis 32 along which movement is enabled. In the working example shown in FIG. 2, for this purpose, one of the positioning units 18 is assigned to the baseplate 30 and enables movement of the base plate 30 in the spatial direction designated "Z". Two further positioning units 18 are assigned to the printhead 22 and enable the printhead 22 to move in the spatial directions designated "X" and "Y". All three positioning units 18 together enable positioning of the printhead 22 in any of the three spatial directions relative to the baseplate 30. The positioning units 18 are actuated by the machine control system 16 which communicates in turn with the control unit 14.

To determine the position of the printhead 22, the 3D printing device 10 has three position measurement units 20. The position measurement units 20 are each assigned to one of the three spatial directions X, Y and Z, and detect the movement of the printhead 22 or the baseplate 30, such that the relative position of the printhead 22 to the baseplate 30 is determined constantly. The position measurement units 20 are connected to the control unit 14. In addition, a connection to the machine control system 16 may be provided.

FIG. 3 shows various movement strategies which can be employed in the context of the invention.

In the dual movement strategy FIG. 3 *a*), the at least one printhead is moved back and forth line by line in a selected main print direction in relation to the baseplate. After each line, the printhead is moved further by one line width perpendicularly to the printing direction. The process is similar to the printing of a conventional inkjet printer.

The xing movement strategy FIG. 3 *b*) corresponds very substantially to the dual movement strategy. By contrast to the dual movement strategy, the main printing direction is rotated by 90° after every or after every nth material layer (where n is a natural number).

Figure 3C:
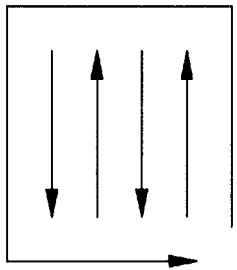

In the border movement strategy FIG. 3*c*), for each material layer, first the outer circumference of the object is produced and subsequently the enclosed area is filled in by means of the dual movement strategy.

The movement strategies mentioned are basic patterns which can be combined and varied within the scope of the same object if it seems appropriate. Mixed forms of various movement strategies are also possible.

FIG. 4 shows various options for placing of print materials 42 in the form of voxels which can be employed in the context of the invention.

Figure 4A:
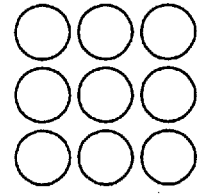
Figure 4B:
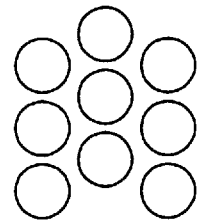
Figure 4C:
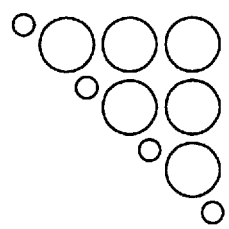
Figure 4D:
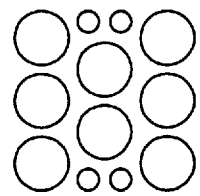

In the first variant FIG. 4*a*), voxels are placed according to a print raster.

In the second variant FIG. 4 *b*), voxels are placed offset relative to one another line by line.

In the third variant FIG. 4 *c*), voxels of different size are placed.

In the fourth variant FIG. 4 *d*), voxels of different size are placed offset relative to one another.

The invention claimed is:

1. In a method of producing an object using a 3D printing device having at least one printhead having at least one discharge device,
    wherein the discharge device is set up to place curable print materials at target positions of the print materials in order to additively manufacture the object, the improvement comprising:
    constantly determining the actual position of the printhead and the instantaneous speed of the printhead by a position measurement unit,
    placing the print materials at the target positions of the print materials by the discharge device depending on the constantly determined actual position of the printhead and on the constantly determined instantaneous speed of the printhead.

2. The method of claim 1, further comprising detecting erroneously unplaced print materials and reprinting before the object is cured.

3. The method of claim 1, wherein the print materials are cured in a location-selective manner or over a full area by means of radiation or by thermal means.

4. The method of claim 1, wherein curing of the print materials is effected after the placing of a layer of print materials, after the placing of multiple layers of print materials, or directly during printing of the print materials.

5. The method of claim 1, wherein curable print materials are placed in the form of voxels, and
    a) an edge sharpness of the object is readjusted by adjusting the voxel size,
    b) a surface quality of the object is readjusted by adjusting a voxel offset, and/or
    c) a dimensional stability of the object is readjusted by adjusting a movement strategy of the discharge device.

6. The method of claim 1, wherein a position of the printhead and/or of a baseplate on which the object is disposed is readjusted depending on the constantly determined actual position of the printhead to acquire an exact position.

7. The method of claim 1, further comprising placing curable print materials in the form of strands, and adjusting the placing of the print materials depending on the constantly determined instantaneous speed of the printhead by adjusting a volume flow rate.

8. The method of claim 1, wherein the object is an elastomer part.

9. The method of claim 1, wherein the object is a silicone elastomer part.

10. An elastomer part produced by the method of claim 1.

11. A computer program for performing the method of claim 1, wherein the computer program is executed in a programmable computer unit.

12. A 3D printing device for production of an object by a 3D printing method, having at least one printhead having at least one discharge device,
    wherein the position of the discharge device is determined by a control unit to place print materials at target positions of the print materials in order to additively manufacture the object,
    wherein the 3D printing device has a position measurement unit by means of which the actual position of the printhead is constantly determined,
    wherein the position measurement unit is connected to the control unit to control the position of the discharge device, and wherein the discharge device is configured to place the print materials at the target positions of the print materials as a function of the constantly determined actual position of the printhead and a constantly determined instantaneous speed of the printhead.

13. The 3D printing device of claim 12, whereby discharge device has at least one jetting nozzle actuated by the control unit and/or a dispenser.

14. The 3D printing device of claim 12, wherein the position measurement unit includes at least one step counter on a motor, a rotary encoder, an optical scale, a GPS sensor, a radar sensor, an ultrasound sensor, a LIDAR sensor, and/or at least one light barrier.

15. The 3D printing device of claim 12, wherein the 3D printing device has a main controller containing a template of the object to be printed, where the main controller and the control unit of the discharge device are configured for bidirectional communication with one another.

16. The 3D printing device of claim 12, wherein the 3D printing device has multiple discharge devices assigned to a printhead, the multiple discharge devices configured to place print materials depending on the constantly determined actual position of the printhead and the constantly determined instantaneous speed of the printhead.

17. The method of claim 1, wherein curable print materials are placed in the form of strands, and
   a) an edge sharpness and a surface quality of the object is readjusted by adjusting a volume flow rate, and/or
   b) a dimensional stability of the object is readjusted by adjusting a movement strategy of the discharge device.

* * * * *